US006938512B2

United States Patent
Tanikawa

(10) Patent No.: US 6,938,512 B2
(45) Date of Patent: Sep. 6, 2005

(54) LUBRICATING SYSTEM FOR AN AUTOMATIC TRANSMISSION

(75) Inventor: Naoya Tanikawa, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 63 days.

(21) Appl. No.: 10/742,756

(22) Filed: Dec. 23, 2003

(65) Prior Publication Data

US 2004/0138022 A1 Jul. 15, 2004

(30) Foreign Application Priority Data

Dec. 24, 2002 (JP) ......................................... 2002-372412

(51) Int. Cl.$^7$ ............................................. F16H 57/04
(52) U.S. Cl. .................................. 74/467; 475/159
(58) Field of Search ...................... 74/467; 475/331, 475/159

(56) References Cited

U.S. PATENT DOCUMENTS 4,719,818 A * 1/1988 McCreary .................... 475/159
5,522,778 A * 6/1996 Iwase et al. .................... 477/62

* cited by examiner

*Primary Examiner*—Dirk Wright
(74) *Attorney, Agent, or Firm*—Burns, Doane, Swecker & Mathis LLP

(57) ABSTRACT

A lubricating system for an automatic transmission including at least one planetary gear set and plural friction engagement elements includes an oil pump which pumps oil to generate oil pressure in response to activation of a driving power source and an introducing passage which is provided at a planetary carrier of the at least one planetary gear set, receives the oil from the oil pump and directs the oil for purposes of lubrication.

22 Claims, 4 Drawing Sheets

LUBRICATING SYSTEM FOR AN AUTOMATIC TRANSMISSION

CROSS REFERENCE TO RELATED APPLICATIONS

This application is based on and claims priority under 35 U.S.C. § 119 with respect to Japanese Patent Application 2002-372412, filed on Dec. 24, 2002, the entire content of which is incorporated herein by reference.

FIELD OF THE INVENTION

This invention generally relates to a lubricating system for an automatic transmission. More particularly, this invention pertains to a lubricating system for an automatic transmission, which is provided with a device for transferring auxiliary power from a driving power source. The device is generally referred to as a power take-off device, i.e., a PTO device.

BACKGROUND

A system for an automatic transmission which transfers auxiliary power from a driving power source, such as an internal combustion engine and an electric motor, for another intended purpose is known. According to U.S. Pat. No. 5,522,778 corresponding to Japanese Patent Laid-Open Publication No. 1995-304348, this type of system for the automatic transmission houses an auxiliary driving gear which is configured to rotate in response to rotation of an automatic transmission input shaft. A power take-off device, i.e., a PTO device, can be operated when the auxiliary driving gear is engaged with a gear of the PTO device, thereby obtaining the auxiliary power for another intended purpose. In the system for the automatic transmission, the PTO device can be operated only while a shift lever has been moved to a neutral or parking position during an on operation of an on/off switch for operating the PTO device.

When a vehicle provided with an automatic transmission is moving forward, the rotational speed of the automatic transmission input shaft is transmitted to an output shaft after having been shifted to a predetermined speed change ratio in the transmission. Therefore, oil already introduced into the output shaft and other shafts rotatable only during the vehicle forward travel is applied with centrifugal force, and then will be supplied to the outer peripheral sides of these shafts. Generally, a bearing is provided between each shaft in the transmission, or between each gear component for a planetary gear set. Therefore, each bearing can be lubricated with the oil supplied to the outer peripheral side of these shafts.

However, when the vehicle is not moving, other shafts rotatable only during the vehicle forward travel and the output shaft are not rotated. Thus, the oil already guided into these shafts is not subjected to a centrifugal force. That is, the oil cannot be supplied to the outer peripheral sides of these shafts. In this case, if the PTO device is operated while the vehicle has been stationary—i.e., while the shift lever has been positioned at the neutral or parking position, each bearing may not be effectively lubricated with the oil.

A need thus exists for providing an improved lubricating system for an automatic transmission capable of sufficiently lubricating each bearing with oil when auxiliary power is needed even during a vehicle stationary condition.

SUMMARY OF THE INVENTION

According to an aspect of the present invention, an automatic transmission is adapted to change a speed change ratio between an input shaft of the transmission and an output shaft connected to an axle in response to activation of a driving power source. The automatic transmission includes at least one planetary gear set and plural friction engagement elements that are adapted to be engaged or disengaged. The at least one planetary gear set includes a sun gear connected to the input shaft to rotate together with the input shaft, a ring gear, at least one rotatable pinion gear arranged between the sun gear and the ring gear, and a planetary carrier supporting the at least one pinion gear for rotation and fixed to a casing of the transmission. When a lubricating system is applied for the automatic transmission, the lubricating system includes an oil pump which pumps oil to generate oil pressure in response to the activation of the driving power source, and an introducing passage which is provided at the planetary carrier and receives the oil from the oil pump and directs the oil for purposes of lubrication.

It is preferable that the lubricating system for the automatic transmission further includes an auxiliary driving gear connected to the sun gear to rotate together with the sun gear, and a pinion pin provided at the planetary carrier. The at least one pinion gear is mounted on the pinion pin. It is further preferable that the lubricating system includes a first bearing provided between an inner peripheral surface of the at least pinion gear and an outer peripheral surface of the pinion pin, and a second bearing provided between the sun gear and the planetary carrier. Then, the oil from the oil pump can be guided to the first bearing via the introducing passage of the planetary carrier and is guided to the second bearing.

BRIEF DESCRIPTION OF THE DRAWING FIGURES

The foregoing and additional features and characteristics of the present invention will become more apparent from the following detailed description considered with reference to the accompanying drawing figures, wherein.

DETAILED DESCRIPTION

Figure 1:
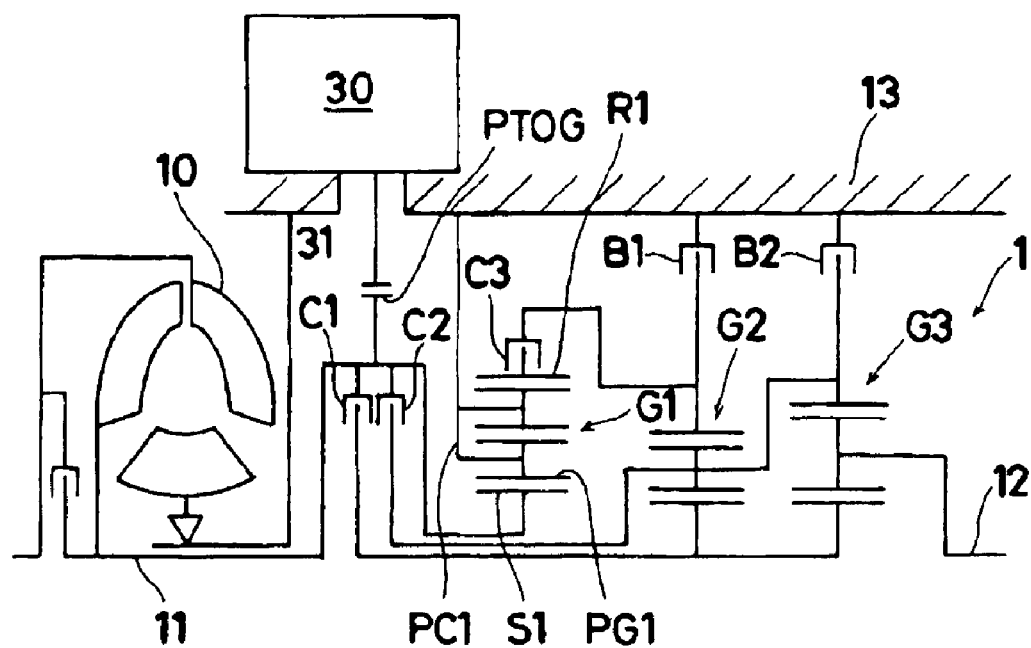
FIG. 1 is a block view schematically illustrating a lubricating system for an automatic transmission according to an embodiment of the present invention.

As illustrated in FIG. 1, output from a driving power source (not shown) is first transmitted via a torque converter and an automatic transmission 1, and is then transmitted to a differential gear unit (not shown) and an axle (not shown). By the way of non-limiting examples, the driving power source includes an internal combustion engine and an electric motor. The automatic transmission 1 houses an input shaft 11 substantially corresponding to an output shaft of the torque converter 10, an output shaft 12 operatively linked to the axle, a first planetary gear set G1 connected to the input shaft 11, a second planetary gear set G2, and a third planetary gear set G3. The automatic transmission 1 further houses plural friction engagement elements such as a first friction clutch C1, a second friction clutch C2, a third friction clutch C3, a first friction brake B1, and a second friction brake B2. These friction engagement elements are housed in a transmission casing 13. A shift stage in the transmission 1 and a shift pattern can be changed in response to engagement or disengagement of the respective plural friction engagement elements. When oil pressure supplied to each friction engagement element is set at a relatively high-pressure level, each friction engagement element will be engaged. In the meantime, when the oil pressure is set at a relatively low-pressure level, each friction engagement element will be disengaged.

The first planetary gear set G1 consisting one planetary gear set includes a sun gear S1 configured to integrally rotate with the input shaft 11, a ring gear R1, a pair of pinion gears PG1 meshingly engaged between the sun gear S1 and the ring gear R1. The first planetary gear set G1 further includes a planetary carrier PC1 fixed to the transmission casing 13 and supporting the pinion gears PG1 for rotation. A power take-off gear PTOG, hereinafter referred to as a gear PTOG, is integrally formed with the sun gear S1 such that auxiliary power can be obtained from power generated in response to activation of the driving power source. The gear PTOG corresponds to an auxiliary driving gear. The gear PTOG is engaged with an operating gear 31 in the automatic transmission 1. When the gear PTOG rotates in response to rotation of the sun gear S1, the operating gear 31 also rotates by virtue of its engagement with the gear PTOG. At this point, the auxiliary power is transmitted to a power take-off device, i.e., to a PTO device. When a clutch (not shown) housed in the PTO device is engaged with the operating gear 31, the auxiliary power can be outputted outward for other intended purposes. In the meantime, when the clutch is disengaged with the operating gear 31, the auxiliary power cannot be outputted. The auxiliary power can be or cannot be outputted outward depending on a position of a shift lever (not shown) and an on/off condition of a switch (not shown) for operating the PTO device. For example, when the shift lever is selected at a neutral or parking position during the on condition of the switch, the clutch can be engaged with the operating gear 31, i.e., the auxiliary power can be outputted outward for intended purposes.

Table 1 below explains a relationship between engagement/disengagement of the respective friction engagement elements and the corresponding shift stages. The automatic transmission 1 according to the embodiment of the present invention can establish six forward shift stages and a single reverse shift stage. In more detail, the automatic transmission 1 includes a reverse shift stage, a neutral shift stage, and the six forward shift stages. The six forward shift stages are characterized by under-drive shift stages, such as first, second, third and fourth shift stages, and over-drive shift stages, such as fifth and sixth shift stages.

TABLE 1

|  |  | C1 | C2 | C3 | B1 | B2 |
|---|---|---|---|---|---|---|
| P-Range | Stop |  |  |  |  |  |
| R-Range | Reverse |  |  | ○ |  | ○ |
| N-Range | Neutral |  |  |  |  | ○ |
| D-Range | Neutral |  |  |  | (○) | ○ |
|  | 1st shift stage | ○ |  |  |  | ○ |
|  | 2nd shift stage | ○ |  |  | ○ |  |
|  | 3rd shift stage | ○ |  | ○ |  |  |
|  | 4th shift stage | ○ | ○ |  |  |  |
|  | 5th shift stage |  | ○ | ○ |  |  |
|  | 6th shift stage |  | ○ |  | ○ |  |
| ○ | Engaged |  |  |  |  |  |
| Blank | Disengaged |  |  |  |  |  |

When only the third friction clutch C3 and the second friction brake B2 are engaged in the transmission 1, the output shaft 12 rotates in a reverse rotating direction relative to the rotation of the input shaft 11, wherein the reverse shift stage can be established in the transmission 1. When only the second friction brake B2 is engaged in the transmission 1, the neutral shift stage can be established therein. When only the first friction clutch C1 and the second friction brake B2 are engaged in the transmission 1, the first shift stage can be established. When only the first friction clutch C1 and the first brake B1 are engaged in the transmission 1, the second shift stage can be established. When only the first and third friction clutches C1 and C3 are engaged in the transmission 1, the third shift stage can be established. When only the first and second friction clutches C1 and C2 are engaged in the transmission 1, the fourth shift stage can be established. When only the second and third friction clutches C2 and C3 are engaged in the transmission 1, the fifth shift stage can be established. Further, when only the second friction clutch C2 and the first friction brake B1 are engaged, the sixth shift stage can be established.

Table 1 above explains the relationship between drive ranges, such as a parking range, a reverse range, a neutral range and a driving range, and the shift stages. The driving ranges are selected in response to the operation of the shift lever. A user may generally operate the shift lever manually. When the driving range for establishing one of the first through sixth shift stages is selected, at least either the first friction clutch C1 or the second friction clutch C2 is engaged. However, when the neutral or parking range is selected, neither the first friction clutch C1 nor the second friction clutch C2 is engaged. Because the vehicle is stationary in the neutral or parking range even while the input shaft 11 has rotated, each shaft arranged at the inner peripheral side of the sun gear S1 cannot be rotated.

Figure 2:
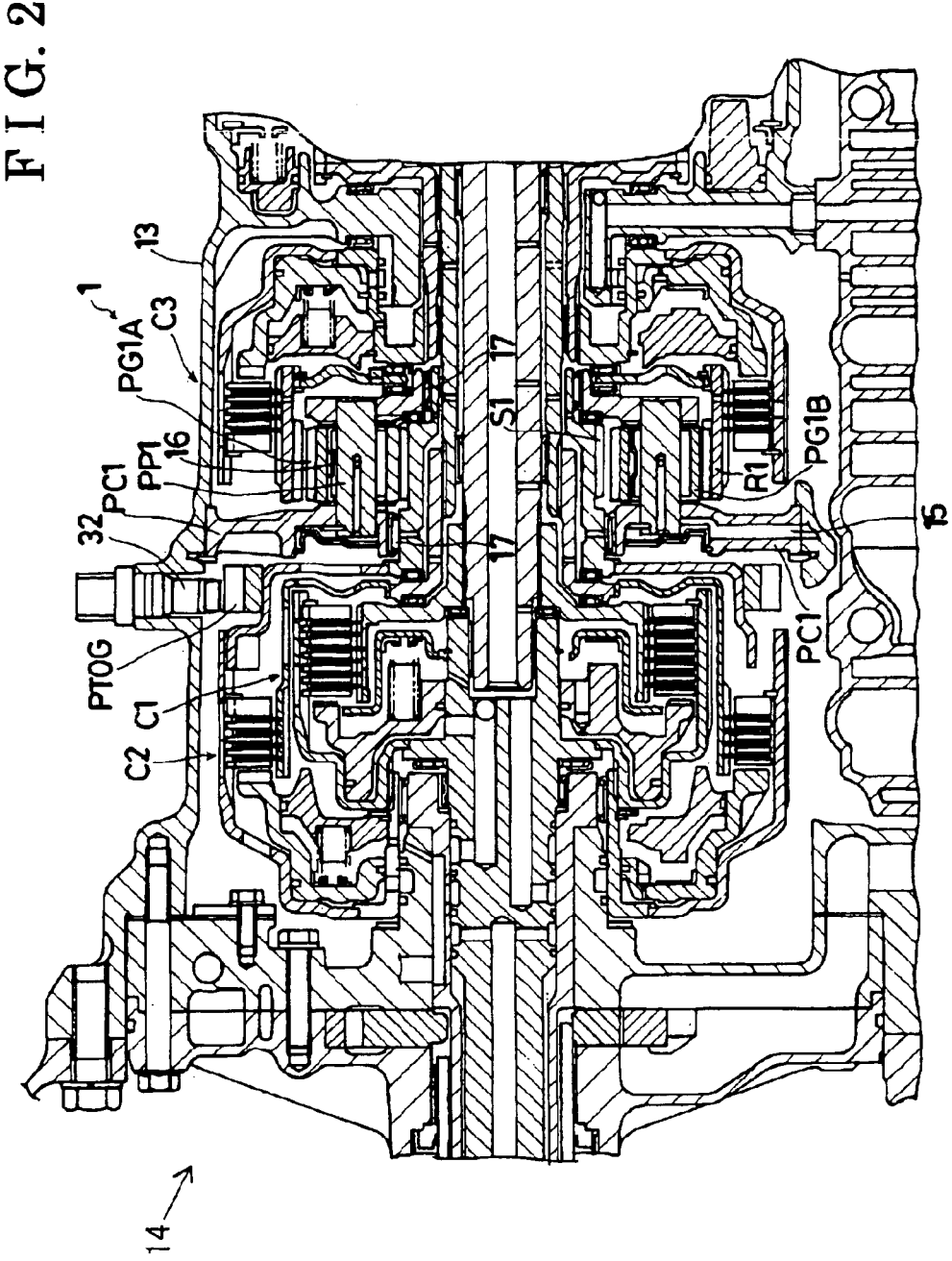
FIG. 2 is a cross-sectional view of a portion of the automatic transmission according to the embodiment of the present invention.

As illustrated in FIG. 2, the automatic transmission 1 is provided with a rotation-detecting sensor 32 for detecting the rotational speed of the gear PTOG instead of detecting the rotational speed of the operating gear 31. The operating gear 31 illustrated in FIG. 1 is not depicted in FIGS. 2 and 3 because of the location of the section line along which FIGS. 2 and 3 are taken.

As illustrated in FIG. 2, an introducing passage 15, i.e., means provided at the planetary carrier for directing oil pumped by the oil pump 14, is defined at the planetary carrier PC1, which is configured to introduce oil pressure generated by an oil pump 14 operated in response to activation of the driving power source such as the internal combustion engine as a non-limiting example. The introducing passage 15 can be preferably defined in the planetary carrier PC1 and can introduce the oil pressure generated by the oil pump 14 because the planetary carrier PC1 is fixed to the transmission casing 13. A pinion pin PP1 is inserted into each pinion gear PG1 so as to support each pinion gear PG1 for rotation. When either the ring gear R1 or the sun gear S1 rotates, each pinion gear PG1 rotates about the axis of the pinion pin PP1. According to the embodiment of the present invention, the planetary gear set G1 is a double pinion type. Therefore, as illustrated in FIG. 2, the pinion gear PG1 at the upper side in the drawing is referred to as a pinion gear PG1A which is engaged with the sun gear S1, and the pinion gear PG1 at the lower side in the drawing is referred to as a pinion gear PG1B which is engaged with the ring gear R1. The pinion gear PG1A is always engaged with the pinion gear PG1B. Alternatively, the planetary gear set G1 can be a single pinion type as a non-limiting example.

Figure 3:
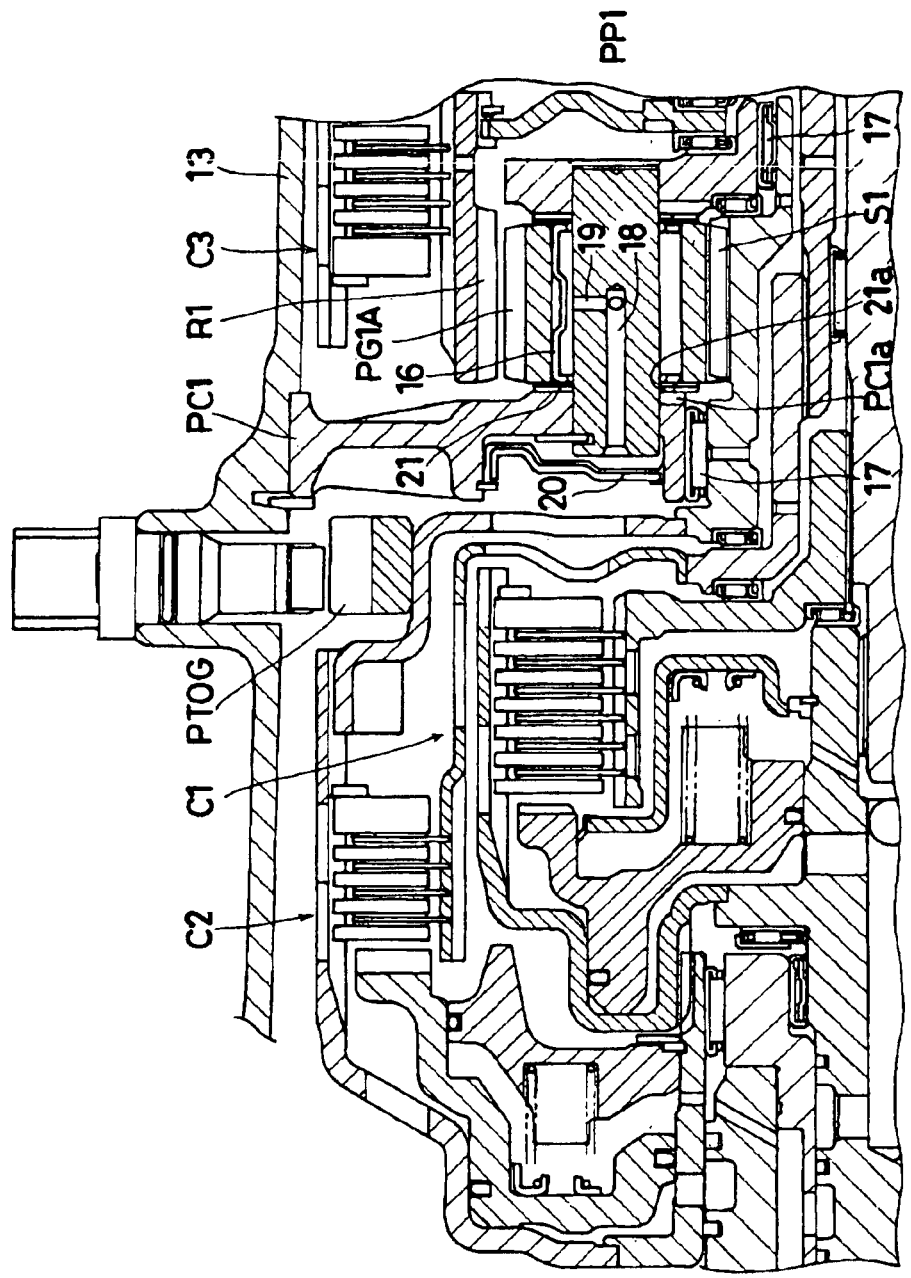
FIG. 3 is an enlarged cross-sectional view of a part of the transmission in FIG. 2.

As illustrated in FIG. 3, a first bearing 16 is disposed between an inner peripheral surface of each pinion gear PG1 and an outer peripheral surface of the corresponding pinion pin PP1. The first bearing 16 is configured to provide smooth relative rotation of the pinion gear PG1 and the pinion pin PP1. A second bearing 17 is disposed between an outer peripheral surface of the sun gear S1 and an inner peripheral surface of the planetary carrier PC1. The second bearing 17 is configured to provide smooth relative rotation of the sun gear S1 and the planetary carrier PC1. By way of non-limiting example, the first bearing 16 can be a pinion bearing, and the second bearing 17 can be a needle bearing.

As described above, according to the illustrated embodiment of the present invention, while the driving power source has been activated, the oil pressure generated by the oil pump 14 can be supplied to the first bearing 16 via the introducing passage 15. Thus, the first bearing 16 can be lubricated with the oil. Further, the oil lubricating the first bearing 16 can be supplied to the second bearing 17 via a clearance between the planetary carrier PC1 and the pinion gear PG1. Thus, the second bearing 17 can be lubricated with the oil. As described above, the bearing can be sufficiently lubricated with the oil even when the auxiliary power is required while the vehicle has been stationary.

An oil-receiving member 20 is provided at the planetary carrier PC1 so as to define a clearance between the planetary carrier PC1 and left ends of the respective pinion pins PP1 in the drawing. A first bore 18 is defined at each pinion pin PP1 from an axially end surface of each pinion pin PP1 towards the other end side thereof. According to the illustrated embodiment of the present invention, the first bore 18 defined in each pinion pin PP1 extends from the left end of each pinion pin PP1 towards a right end. In the illustrated embodiment, the first bore 18 in each pinion pin PP1 is a blind bore. A second bore 19 is defined at each pinion pin PP1 and communicates with the first bore 18 and the outer peripheral surface of each pinion pin PP1. According to the embodiment of the present invention, the second bore 19 is defined in each pinion pin PP1 and extends between the right end side of the first bore 18 and the outer peripheral surface of each pinion pin PP1. The first and second bores 18 and 19 form a communicating bore, communicating means provided at the pinion pin, which is configured to communicate the axially end surface of each pinion pin PP1 with the outer peripheral surface of the pinion pin PP1.

Figure 4:
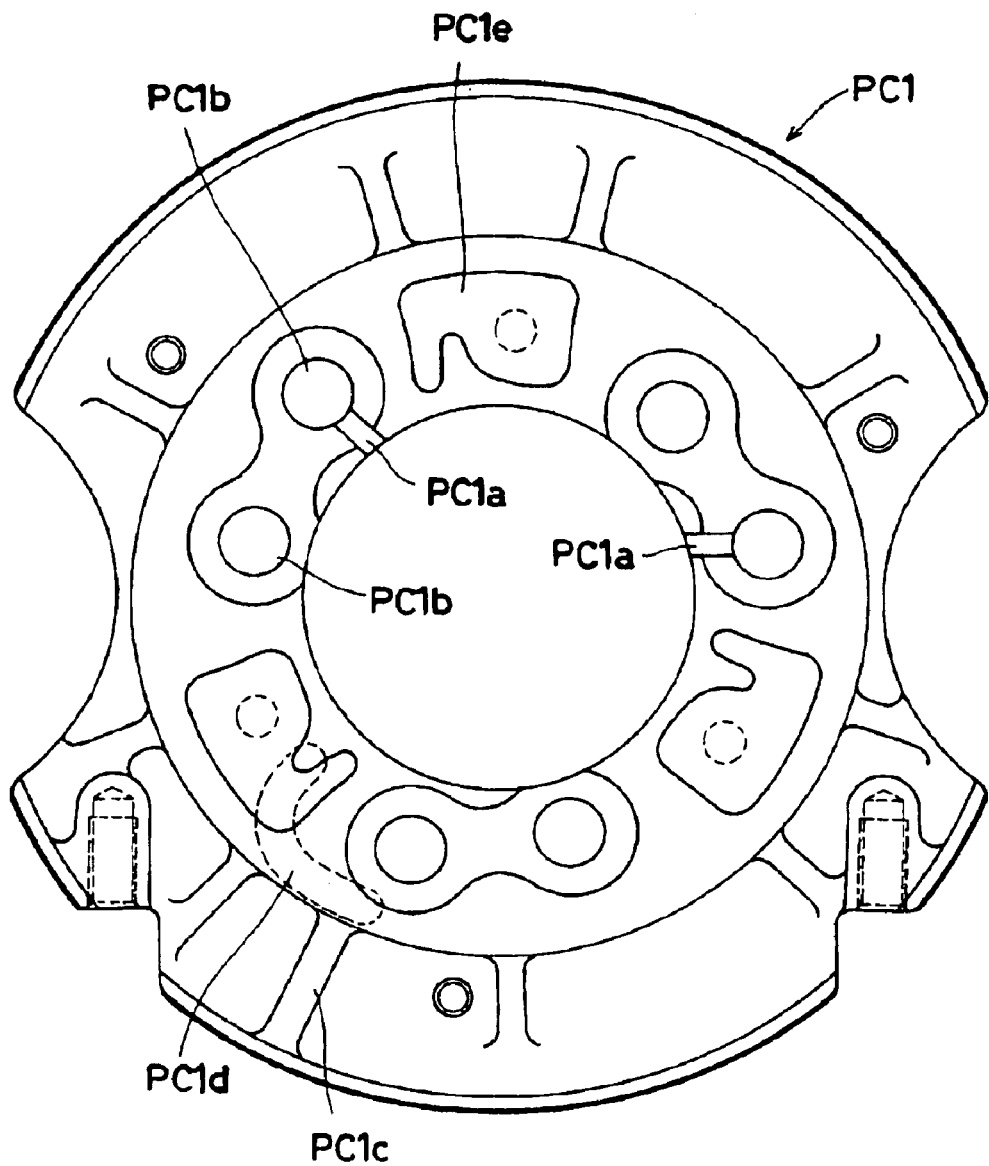
FIG. 4 is a side view of portions of the planetary carrier illustrated in FIG. 3 viewed from the right side in FIG. 3.

Lubricating grooves PC1a are defined at a surface of the planetary carrier PC1. The surface of the planetary carrier PC1 at which the lubricating grooves PC1 a are provided faces an axially end surfaces of the pinion gears PG1. By way of these lubricating grooves PC1a, the second bearing 17 can be lubricated with the oil guided through a clearance between the planetary carrier PC1 and the pinion gears PG1. As illustrated in FIG. 4, the planetary carrier PC1 has supporting bores PC1b configured to support the pinion pins PP1, guiding grooves PC1d connected to the introducing passage 15 and configured to guide the oil conveyed from the oil pump 14 to a clearance between the left end surfaces of the pinion pins PP1 and the oil receiving member 20, and connecting poles PC1e configured to link the right side of the planetary carrier PC1 illustrated in FIG. 3 with the axially right ends of the pinion pins PP1. Washers 21 are disposed between the planetary carrier PC1 and the respective pinion gears PG1. Although the guiding passage 15 is not illustrated in FIG. 4, the guiding passage 15 is defined along rib portions PC1c which reinforce the planetary carrier PC1. FIG. 4 illustrates only a single guiding groove PC1d. However, it is to be understood that a similar guiding groove PC1d is connected to each of the other pairs of pinion pins PP1, respectively.

As illustrated in FIG. 4, a lubricating groove PC1a is not defined at the portion of the surface of the planetary carrier PC1 which faces the pinion gear PG1 located at the downside of the center of the planetary carrier PC1. The oil pressure, which was generated by the oil pump 14, can be also supplied to the inside of the first bearing 16 between the pinion pin PP1 and the pinion gear PG1 at the downside of the center of the planetary carrier PC1. However, an oil passage becomes larger around the second bearing 17. Therefore, the oil pressure to be supplied to the second bearing 17 from the inside of the first bearing 16 will become relatively low pressure which is substantially the same pressure level as ambient pressure. Therefore, it may be difficult for the oil to be supplied to the second bearing 17, which is near the pinion gear PG1 located at an upper side of the center of the planetary carrier PC1, from the supporting bore PC1b for the pinion gear PG1 downward of the center of the planetary carrier PC1. This is the reason why the lubricating groove PC1a is not defined at the portion of the surface of the planetary carrier PC1 which faces the pinion gear PG1 located at the downside of the center of the planetary carrier PC1.

The following description describes the lubrication of each of the bearings 16 and 17 by the lubricating system described above. When the shift lever is selected at the neutral or parking range, the engine rotation cannot be transmitted to each shaft arranged at the inner peripheral side of the sun gear S1. Therefore, when the vehicle is stationary, the oil introduced to the inside of each shaft at the inner peripheral side of the sun gear S1 may not be applied with centrifugal force. In this case, the first and second bearings 16 and 17 cannot be effectively lubricated by the oil guided to the inside of each shaft. Meanwhile, the oil pump 14 is operated in response to activation of the driving power source such as the internal combustion engine, whereby the oil pressure generated by the oil pump 14 can be supplied to the clearance between the end surface of the pinion pins PP1 and the oil receiving portion 20 via the guiding passage 15 and the guiding grooves PC1d. The oil pressure in the clearance can be further supplied to the clearance between the inner peripheries of the pinion gears PG1 and the outer peripheries of the pinion pins PP1 through the first and second bores 18 and 19. In this case, the first bearings 16 can be effectively lubricated with the oil.

Each washer 21 is provided with a notch portion 21a. The oil lubricating the first bearings 16 is then supplied to the clearance between the inner peripheral surface of the planetary carrier PC1 and the outer peripheral surface of the sun gear S1 via the notch portions 21a and the lubricating grooves PC1a. In this case, the second bearing 17 can be effectively lubricated with the oil. The oil used for lubricating the second bearing 17 flows into an oil strainer (not shown) arranged downside of the automatic transmission 1. Therefore, the oil can be further supplied to the first bearings 16 and the second bearing 17 through the above-described lubricating mechanism in response to the operation of the oil pump 14.

As described above, according to the embodiment of the present invention, the guiding passage 15 can be defined in the planetary carrier PC1 and the oil can flow through the guiding passage 15 because the planetary carrier PC1 is fixed to the transmission casing 13. Therefore, when the driving power source is activated even during the vehicle stationary condition—i.e., when the PTO device. 30 is intended to be operated so as to obtain the auxiliary power even during the vehicle stationary condition, both of the first bearings 16 and the second bearing 17 can be sufficiently lubricated with the oil.

The principles, an embodiment and mode of operation of the present invention have been described in the foregoing specification and drawings. However, the invention which is intended to be protected is not to be construed as limited to the particular embodiment disclosed. Further, the embodiments described herein are to be regarded as illustrative rather than restrictive. Plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A lubricating system for an automatic transmission adapted to change a speed change ratio between an input shaft of the transmission and an output shaft connected to an axle in response to activation of a driving power source, the automatic transmission comprising at least one planetary gear set and plural friction engagement elements that are adapted to be engaged or disengaged, the at least one planetary gear set comprising a sun gear connected to the input shaft to rotate together with the input shaft, a ring gear, at least one rotatable pinion gear arranged between the sun gear and the ring gear, and a planetary carrier supporting the at least one pinion gear for rotation and fixed to a casing of the transmission, the lubricating system comprising:

an oil pump which pumps oil to generate oil pressure in response to the activation of the driving power source; and an introducing passage which is provided at the planetary carrier and receives the oil from the oil pump and directs the oil for purposes of lubrication.

2. The lubricating system for an automatic transmission according to claim 1, further comprising:

an auxiliary driving gear connected to the sun gear to rotate together with the sun gear;

a pinion pin provided at the planetary carrier, the at least one pinion gear being mounted on the pinion pin;

a first bearing provided between an inner peripheral surface of the at least pinion gear and an outer peripheral surface of the pinion pin; and a second bearing provided between the sun gear and the planetary carrier, the oil from the oil pump being guided to the first bearing via the introducing passage of the planetary carrier and being guided to the second bearing.

3. The lubricating system for an automatic transmission according to claim 2, further comprising:

a communicating bore provided at the pinion pin which communicates with a space between the outer peripheral surface of the pinion pin and the inner peripheral surface of the at least pinion gear in which is positioned the first bearing, wherein the first bearing is lubricated with the oil from the oil pump via the introducing passage and the communicating bore.

4. The lubricating system for an automatic transmission according to claim 3, wherein the communicating bore includes a first bore extending from one end surface of the pinion pin towards an opposite end surface of the pinion pin, and a second bore communicating with the first bore and extending to the outer peripheral surface of the pinion pin so that the oil is introduced into the first bore after passing through the introducing passage and is directed to the outer peripheral surface of the pinion pin by way of the second bore.

5. The lubricating system for an automatic transmission according to claim 2, further comprising:

a lubricating groove at a surface of the planetary carrier facing the at least one pinion gear, the oil being guided to the second bearing by way of the lubricating groove to lubricate the second bearing.

6. The lubricating system for an automatic transmission according to claim 3, further comprising:

a lubricating groove at a surface of the planetary carrier facing the at least one pinion gear, the oil in the space between the outer peripheral surface of the pinion pin and the inner peripheral surface of the at least one pinion gear being directed by way of the lubricating groove to a clearance between the planetary carrier and the sun gear to lubricate the second bearing which is positioned in the clearance.

7. The lubricating system for an automatic transmission according to claim 5, further comprising:

a washer provided between the planetary carrier and the at least one pinion gear and having a notch permitting oil in a space between the outer peripheral surface of the pinion pin and the inner peripheral surface of the at least one pinion gear to flow into the lubricating groove.

8. The lubricating system for an automatic transmission according to claim 6, further comprising:

a washer provided between the planetary carrier and the at least pinion gear and having a notch permitting oil in the space between the outer peripheral surface of the pinion pin and the inner peripheral surface of the at least one pinion gear to flow into the lubricating groove.

9. The lubricating system for an automatic transmission according to claim 1, wherein the planetary gear set is a double pinion type or a single pinion type.

10. An automatic transmission which changes a speed change ratio between an input shaft of the transmission and an output shaft connected to an axle in response to activation of a driving power source, comprising plural friction engagement elements adapted to be engaged or disengaged;

an oil pump which pumps oil in response to the activation of the driving power source to generate oil pressure;

at least one planetary gear set comprising:

a sun gear connected to the input shaft to rotate together with the input shaft;

a ring gear;

a planetary carrier fixed to a casing of the transmission;

a pinion pin mounted on the planetary carrier;

a pinion gear supported on the pinion pin and arranged between the sun gear and the ring gear; and means provided at the planetary carrier for directing oil pumped by the oil pump towards a space between an inner peripheral surface of the pinion gear and an outer peripheral surface of the pinion pin.

11. The automatic transmission according to claim 10, wherein the means for directing oil is a passage formed in the planetary carrier that extends radially inwardly from an outer periphery of the planetary carrier.

12. The automatic transmission according to claim 10, further comprising:

an auxiliary driving gear connected to the sun gear to rotate together with the sun gear;

a first bearing provided in the space between the inner peripheral surface of the pinion gear and the outer peripheral surface of the pinion pin; and a second bearing provided between the sun gear and the planetary carrier, the oil pumped by the oil pump being directed towards the space via the means for directing oil to lubricate the first bearing and being guided from the space to the second bearing to lubricate the second bearing.

13. The automatic transmission according to claim 12, further comprising:

communicating means provided at the pinion pin for communicating with the space between the outer peripheral surface of the pinion pin and the inner peripheral surface of the at least pinion gear, the oil being guided to the space via the means for directing and via the communicating means to lubricate the first bearing.

14. The automatic transmission according to claim 12, further comprising first and second bores formed in the pinion pin, the first bore being a blind bore extending from one end surface of the pinion pin towards an opposite end surface of the pinion pin, the second bore extending from the first bore to the outer peripheral surface of the pinion pin, the oil being guided to the space between the outer peripheral surface of the pinion pin and the inner peripheral surface of the at least pinion gear via the means for directing and via the first and second bores.

15. The automatic transmission according to claim 13, further comprising:

a groove provided in a surface of the planetary carrier, the groove communicating with a clearance between an inner peripheral surface of the planetary carrier and an outer peripheral surface of the sun gear, the second bearing being located in the clearance; and a washer provided between the planetary carrier and the at least pinion gear, the washer being provided with a notch permitting oil in the space between the outer peripheral surface of the pinion pin and the inner peripheral surface of the at least pinion gear to flow into the groove which communicates with the clearance to lubricate the second bearing.

16. The automatic transmission according to claim 10, wherein the planetary gear set is a double pinion type or a single pinion type.

17. A method of lubricating an automatic transmission adapted to change a speed change ratio between an input shaft of the transmission and an output shaft connected to an axle in response to activation of a driving power source, the transmission comprising at least one planetary gear set and plural friction engagement elements that are adapted to be engaged or disengaged, the at least one planetary gear set comprising a sun gear connected to the input shaft to rotate together with the input shaft, a ring gear, at least one pinion gear arranged between the sun gear and the ring gear, and a planetary carrier rotatably supporting the at least one pinion gear, the method comprising:

pumping oil within the transmission upon activation of the driving power source; and directing the oil along a passage in the planetary carrier while the planetary carrier is fixed to a casing of the transmission.

18. The method of lubricating an automatic transmission according to claim 17, wherein the transmission further comprises:

an auxiliary driving gear connected to the sun gear to rotate integrally with the sun gear, a pinion pin mounted at the planetary carrier and rotatably supporting the at least one pinion gear, a first bearing positioned in a space between an inner peripheral surface of the at least pinion gear and an outer peripheral surface of the pinion pin, and a second bearing provided in a clearance between an outer peripheral surface of the sun gear and an inner peripheral surface of the planetary carrier; the method further comprising:

guiding the oil to the space via the passage to lubricate the first bearing; and guiding the oil from the space to the clearance to lubricate the second bearing.

19. The method of lubricating an automatic transmission according to claim 18, wherein the pinion pin is provided with a communicating bore that opens to the space between the inner peripheral surface of the at least pinion gear and the outer peripheral surface of the pinion pin, and wherein the oil is guided to the space by way of the passage and the communicating bore.

20. The method of lubricating an automatic transmission according to claim 18, wherein the pinion pin is provided with a first bore which opens to one end surface of the pinion pin and a second bore communicating with the first bore and extending from the first bore to the outer peripheral surface of the pinion pin, and wherein the oil is guided to the space by passing through the passage, through the first bore and through the second bore.

21. The method of lubricating an automatic transmission according to claim 18, wherein a surface of the planetary carrier facing the at least one pinion gear is provided with a lubricating groove, and wherein the oil is guided from the space to the clearance by way of the lubricating groove.

22. The method of lubricating an automatic transmission according to claim 21, including a washer provided between the planetary carrier and the at least one pinion gear, the washer being provided with a notch, and wherein the oil is guided from the space to the clearance by way of the lubricating groove and the notch in the washer.

* * * * *